(12) United States Patent
Inoue

(10) Patent No.: US 12,094,248 B2
(45) Date of Patent: *Sep. 17, 2024

(54) INFORMATION PROCESSING SYSTEM, INFORMATION PROCESSING METHOD, AND STORAGE MEDIUM

(71) Applicant: NEC Corporation, Tokyo (JP)

(72) Inventor: Mamoru Inoue, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/230,051

(22) Filed: Aug. 3, 2023

(65) Prior Publication Data

US 2023/0377372 A1 Nov. 23, 2023

Related U.S. Application Data

(63) Continuation of application No. 17/548,903, filed on Dec. 13, 2021, now Pat. No. 11,783,631, which is a continuation of application No. 16/470,056, filed as application No. PCT/JP2018/034289 on Sep. 14, 2018, now Pat. No. 11,232,615.

(30) Foreign Application Priority Data

Nov. 29, 2017 (JP) ................................. 2017-228759

(51) Int. Cl.
*G06T 11/60* (2006.01)
*G06V 10/50* (2022.01)
*G06V 40/18* (2022.01)

(52) U.S. Cl.
CPC ............ *G06V 40/193* (2022.01); *G06T 11/60* (2013.01); *G06V 10/50* (2022.01); *G06V 40/197* (2022.01)

(58) Field of Classification Search
CPC .... G06V 40/193; G06V 10/50; G06V 40/197; G06T 11/60
USPC ......................................................... 345/634
See application file for complete search history.

(56) References Cited

U.S. PATENT DOCUMENTS

| | | | |
|---|---|---|---|
| 5,291,560 A | 3/1994 | Daugman | |
| 7,146,983 B1 | 12/2006 | Hohla | ..................... A61B 5/117 606/4 |
| 8,170,295 B2 | 5/2012 | Fujii et al. | |

(Continued)

FOREIGN PATENT DOCUMENTS

| | | |
|---|---|---|
| JP | H08-504979 A | 5/1996 |
| JP | H08-266476 A | 10/1996 |

(Continued)

OTHER PUBLICATIONS

International Search Report for PCT/JP2018/034289, dated Oct. 23, 2018.

(Continued)

*Primary Examiner* — Charlotte M Baker
(74) *Attorney, Agent, or Firm* — Sughrue Mion, PLLC

(57) ABSTRACT

Provided is an information processing system including: a comparison information acquisition unit that acquires comparison information regarding iris comparison generated based on an iris image including an iris of a recognition subject; and a display image generation unit that generates a display image including an image indicating a content of the comparison information in association with positions in the iris.

9 Claims, 13 Drawing Sheets

(56) References Cited

U.S. PATENT DOCUMENTS

| | | | |
|---|---|---|---|
| 10,702,145 B2 | 7/2020 | Kobayashi | |
| 2003/0152252 A1 | 8/2003 | Kondo | G07C 9/37 382/117 |
| 2005/0068497 A1* | 3/2005 | Hanebuchi | A61B 3/103 351/208 |
| 2005/0226470 A1 | 10/2005 | Kondo et al. | |
| 2006/0165266 A1 | 7/2006 | Hamza | |
| 2007/0036397 A1 | 2/2007 | Hamza | |
| 2010/0014718 A1 | 1/2010 | Savvides et al. | |
| 2014/0161825 A1 | 6/2014 | Bergen | |
| 2015/0293382 A1* | 10/2015 | Jethmalani | G02C 13/003 351/204 |
| 2016/0364610 A1 | 12/2016 | Jung et al. | |

FOREIGN PATENT DOCUMENTS

| | | |
|---|---|---|
| JP | H10-162146 A | 6/1998 |
| JP | 10340342 A | 12/1998 |
| JP | 2000-207536 A | 7/2000 |
| JP | 2003-173443 A | 6/2003 |
| JP | 2006-099718 A | 4/2006 |
| JP | 2006-201920 A | 8/2006 |
| JP | 2006343995 A | 12/2006 |
| JP | 2008-090482 A | 4/2008 |
| JP | 2008-090483 A | 4/2008 |
| JP | 2008-538425 A | 10/2008 |
| JP | 2015-536519 A | 12/2015 |
| WO | 2004/090814 A1 | 10/2004 |

OTHER PUBLICATIONS

Communication dated Nov. 17, 2020, from the Japanese patent Office in application No. 2019-557022.

Partial Supplementary European Search Report for EP Application No. EP18883401.4 dated on Feb. 26, 2021.

Sarah Ring et al: "Detection of Iris Texture Distortions by Analyzing Iris Coe Matching Results", Biometrics: Theory, Applications and Systems, 2008 BTAS 2008. 2nd IEEE International Conference on, IEEE, Piscataway, NJ, USA, Sep. 29, 2008 (Sep. 29, 2008), pp. 1-6, XP031371254.

Manisha Sam Sunder et al: "Iris Image Retrieval Based on Macrofeatures", 2010 20th International Conference on Pattern Recognition (ICPR 2010): Istanbul, Turkey, Aug. 23-26, 2010, IEEE, Piscataway, NJ, USA, Aug. 23, 2010 (Aug. 23, 2010), pp. 1318-1321, XP031772700.

Extended European Search Report for EP Application No. EP18883401.4 dated Jul. 14, 2021.

Japanese Office Action for JP Application No. 2021-103717 mailed on Jun. 28, 2022 with English Translation.

JP Office Action for JP Application No. 2021-103717, mailed on Sep. 8, 2022 with English Translation.

Tsukada, "Iris Authentication", Information Processing Society of Japan, Nov. 15, 1999, vol. 40, No. 11, pp. 1084-1087.

John Daugman, "How Iris Recognition Works", IEEE Transactions on Circuits and Systems for Video Technology, vol. 14, No. 1, Jan. 2004, pp. 1-11.

US Office Action for U.S. Appl. No. 18/232,168, mailed on Mar. 1, 2024.

* cited by examiner

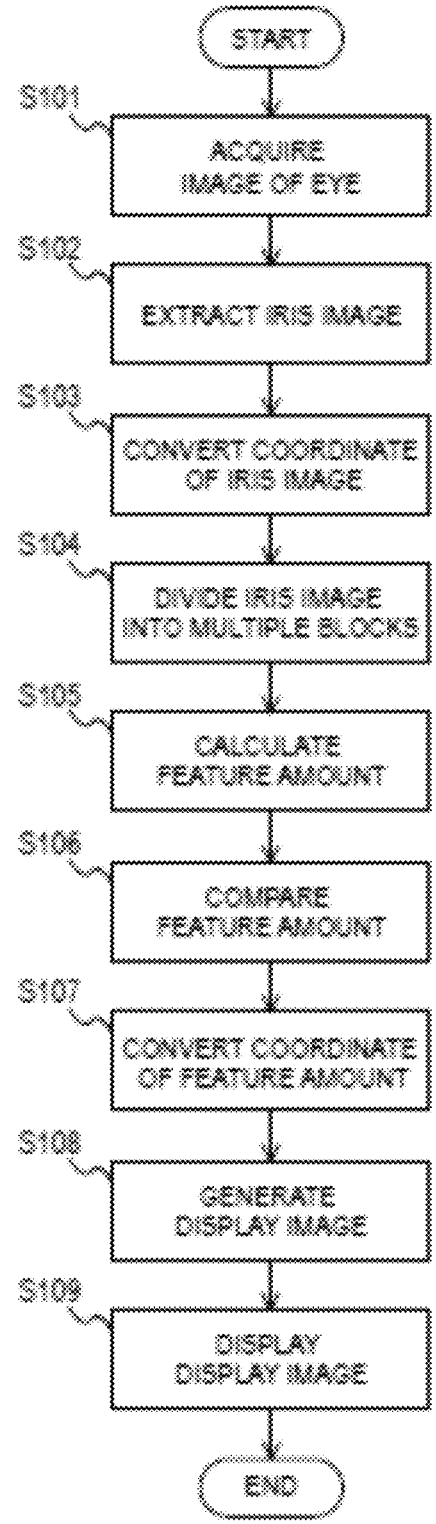

INFORMATION PROCESSING SYSTEM, INFORMATION PROCESSING METHOD, AND STORAGE MEDIUM

CROSS-REFERENCE TO RELATED APPLICATIONS

The present application is a continuation application of U.S. patent application Ser. No. 17/548,903 filed on Dec. 13, 2021, which is a continuation application of U.S. patent application Ser. No. 16/470,056 filed on Jun. 14, 2019, which issued as U.S. Pat. No. 11,232,615, which is a National Stage Entry of international application PCT/JP2018/034289, filed on Sep. 14, 2018, which claims the benefit of priority from Japanese Patent Application 2017-228759 filed on Nov. 29, 2017, the disclosures of all of which are incorporated in their entirety by reference herein.

TECHNICAL FIELD

The present invention relates to an information processing system, an information processing method, and a storage medium.

BACKGROUND ART

Patent Literature 1 discloses an individual authentication system having a unit that encodes a feature of an iris image. This individual authentication system performs individual authentication by comparing a code of an iris image registered in advance with a code of an iris image acquired at the time of authentication. At this time, a notification window of an authentication result is displayed on a display unit of the individual authentication system.

CITATION LIST

Patent Literature

PTL 1: Japanese Patent Application Laid-Open No. 2008-90482

SUMMARY OF INVENTION

Technical Problem

The individual authentication system disclosed in Patent Literature 1 does not disclose notifying the user of information regarding iris comparison in addition to the validness of authentication. However, it may be desirable to notify the user of information regarding iris comparison in association with positions in an iris.

The present invention has been made in view of the above problem and intends to provide an information processing system, an information processing method, and a storage medium that can display information regarding iris comparison in association with positions in an iris.

Solution to Problem

According to one example aspect of the present invention, provided is an information processing system including: a comparison information acquisition unit that acquires comparison information regarding iris comparison generated based on an iris image including an iris of a recognition subject; and a display image generation unit that generates a display image including an image indicating a content of the comparison information in association with positions in the iris.

According to another example aspect of the present invention, provided is an information processing method including: acquiring comparison information regarding iris comparison generated based on an iris image including an iris of a recognition subject; and generating a display image including an image indicating a content of the comparison information in association with positions in the iris.

According to one yet another example aspect of the present invention, provided is a storage medium storing an information processing program that causes a computer to perform: acquiring comparison information regarding iris comparison generated based on an iris image including an iris of a recognition subject; and generating a display image including an image indicating a content of the comparison information in association with positions in the iris.

Advantageous Effects of Invention

According to the present invention, it is possible to provide an information processing system, an information processing method, and a storage medium that can display information regarding iris comparison in association with positions in an iris.

BRIEF DESCRIPTION OF DRAWINGS

FIG. 4 is a flowchart illustrating the outline of a process performed by the information processing system according to the first example embodiment.

DESCRIPTION OF EMBODIMENTS

Exemplary example embodiments of the present invention will be described below with reference to the drawings. Throughout the drawings, the same components or corresponding components are labeled with the same references, and the description thereof may be omitted or simplified.

First Example Embodiment

Figure 1:
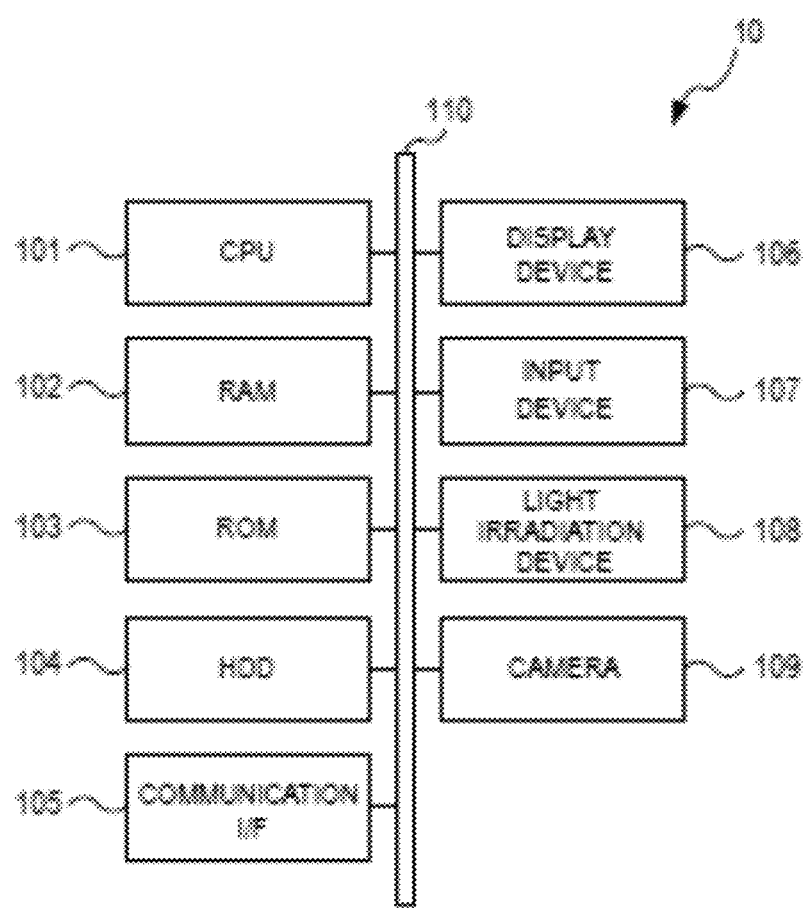
FIG. 1 is a block diagram illustrating a hardware configuration example of an information processing system according to a first example embodiment.

FIG. 1 is a block diagram illustrating a hardware configuration example of an information processing system 10 according to the present example embodiment. The information processing system 10 may be, for example, an iris recognition apparatus. Further, the information processing system 10 has a function of a computer. For example, the information processing system 10 may be configured integrally with a desktop personal computer (PC), a laptop PC, a tablet PC, a smartphone, or the like. The information processing system 10 has a function of iris comparison, which is a type of biometrics recognition. The information processing system 10 captures an image (an iris image) including an iris of a recognition subject and performs iris comparison by comparing the captured image with a registered iris image. The pattern of an iris that adjusts the opening diameter of a pupil is unique and permanent for a person. It is therefore possible to perform identity verification by comparing a pattern of an iris acquired at the time of comparison with an iris image registered in advance.

The information processing system 10 may be applied to, for example, identity verification at the time of login into a PC, identity verification for entry into or departure from a country at an airport, a seaport, or a boundary, identity verification in a government office, identity verification for entry into or exit from a factory or an office, identity verification at the time of entry into an event site, or the like.

The information processing system 10 has a central processing unit (CPU) 101, a random access memory (RAM) 102, a read only memory (ROM) 103, and a hard disk drive (HDD) 104 in order to implement functions as a computer that performs operation and storage. Further, the information processing system 10 has a communication interface (I/F) 105, a display device 106, an input device 107, a light irradiation device 108, and a camera 109. The CPU 101, the RAM 102, the ROM 103, the HDD 104, the communication I/F 105, the display device 106, the input device 107, the light irradiation device 108, and the camera 109 are connected to each other via a bus 110. Note that the display device 106, the input device 107, the light irradiation device 108, and the camera 109 may be connected to the bus 110 via a drive device (not illustrated) used for driving these devices.

While respective units forming the information processing system 10 are illustrated in FIG. 1 as an integrated device, some of the functions thereof may be formed by an externally attached device. For example, the display device 106, the input device 107, the light irradiation device 108, and the camera 109 may be externally attached devices that are separate from a part forming the function of a computer including the CPU 101 or the like. At this time, the light irradiation device 108 and the camera 109 may be a part of an externally attached iris recognition apparatus of the information processing system 10. In such a case, the information processing system 10 may be an information display apparatus for displaying information acquired by the iris recognition apparatus.

The CPU 101 has a function of performing a predetermined operation in accordance with a program stored in the ROM 103, the HDD 104, or the like and controlling each unit of the information processing system 10. The RAM 102 is formed of a volatile storage medium and provides a temporary memory field required for the operation of the CPU 101. The ROM 103 is formed of a nonvolatile storage medium and stores necessary information such as a program used in the operation of the information processing system 10. The HDD 104 is a storage device that is formed of a nonvolatile storage medium and stores an image captured by the camera 109 or the like, an image of a recognition subject, a feature amount, or the like.

The communication I/F 105 is a communication interface based on a specification such as Wi-Fi (registered trademark), 4G, or the like, which is a module for communicating with other devices. The display device 106 is a liquid crystal display, an organic light emitting diode (OLED) display, or the like and is used for displaying a moving image, a static image, a text, or the like. The input device 107 is a button, a touchscreen, a keyboard, a pointing device, or the like and is used by a user to operate the information processing system 10. The display device 106 and the input device 107 may be integrally formed as a touchscreen.

The light irradiation device 108 is used as a light source used for capturing performed by the camera 109. The camera 109 can capture an eye of a recognition subject or the like by using a light emitted from the light irradiation device 108 and acquire an image. A digital camera using a Complementary Metal Oxide Semiconductor (CMOS) image sensor, a Charge Coupled Device (CCD) image sensor, or the like may be used as the camera 109 so as to be suitable for image processing after capturing.

Note that a light emitted from the light irradiation device 108 is not limited to a visible light and may be an infrared light. In such a case, the light irradiation device 108 may include a light emitting element such as an infrared LED that emits an infrared light. Furthermore, the camera 109 may include a light receiving element configured to have a sensitivity to infrared rays. The light irradiation device 108 irradiates an eye of a recognition subject with an infrared light and captures a infrared ray reflected by an iris by using the camera 109, and thereby an iris image used in iris comparison can be captured. By acquiring an iris image by using an infrared ray, it is possible to obtain a high contrast image regardless of the color of the iris and reduce an influence of a reflection by a cornea. Note that the wavelength of an infrared ray irradiated from the light irradiation device 108 may be, for example, a near-infrared region around 800 nm. When the above influence is not a problem, however, the light irradiation device 108 and the camera 109 may be devices for a visible light.

Note that the hardware configuration illustrated in FIG. 1 is an example, and a device other than the devices thereof may be added, or some of the devices may not be provided. Further, some of the devices may be replaced with another device having a similar function. Furthermore, some of the functions may be provided by another device via a network, or the functions forming the present example embodiment may be implemented by being distributed in a plurality of devices. For example, the HDD 104 may be replaced with a solid state drive (SSD) using a semiconductor element such as a flash memory or may be replaced with cloud storage.

Figure 2:
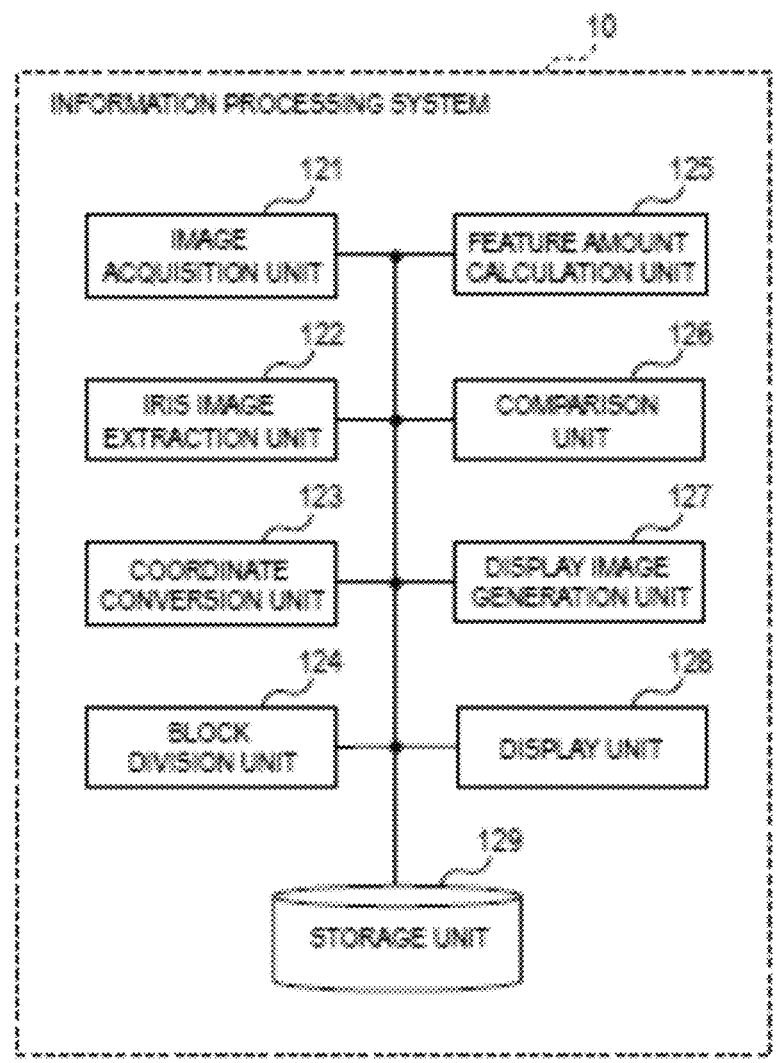
FIG. 2 is a function block diagram of the information processing system according to the first example embodiment.

FIG. 2 is a function block diagram of the information processing system 10 according to the present example embodiment. The information processing system 10 has an image acquisition unit 121, an iris image extraction unit 122, a coordinate conversion unit 123, a block division unit 124, a feature amount calculation unit 125, a comparison unit 126, a display image generation unit 127, a display unit 128, and a storage unit 129.

The CPU 101 implements the function of the image acquisition unit 121 that acquires an image of an eye of a recognition subject by controlling the light irradiation device 108 and the camera 109. The CPU 101 loads and executes a program stored in the ROM 103 or the like to the RAM 102 and thereby implements the functions of the iris image extraction unit 122, the coordinate conversion unit 123, the block division unit 124, the feature amount calculation unit 125, the comparison unit 126, and the display image generation unit 127. The process performed by each of these units will be described later. The display unit 128 displays a display image generated by the display image generation unit 127. The CPU 101 implements the function of the display unit 128 by controlling the display device 106. The storage unit 129 stores data such as an image of an eye acquired by the image acquisition unit 121, an image of an eye registered in advance, an iris image extracted therefrom, a feature amount calculated from the iris image, or the like. The CPU 101 implements a function of the storage unit 129 by controlling the HDD 104.

FIGS. 3A-3I are a schematic diagram illustrating the outline of the process performed by the information processing system 10 according to the present example embodiment. FIG. 4 is a flowchart illustrating the outline of the process performed by the information processing system 10 according to the present example embodiment. With reference to FIGS. 3A-3I if necessary, the outline of the process performed by the information processing system 10 will be described along the flowchart of FIG. 4.

In step S101 of FIG. 4, the image acquisition unit 121 acquires an image of an eye of a recognition subject. This process corresponds to FIG. 3(a). The acquired image is stored in the storage unit 129. Typically, this image is acquired by using an infrared ray, which is a grayscale image.

In step S102 of FIG. 4, the iris image extraction unit 122 determines a region of an iris from the image of the eye of the recognition subject and extracts an iris image. This process corresponds to FIG. 3(b) and FIG. 3(c).

One example of the method of determining a region of an iris will be described. The iris image extraction unit 122 detects a pupil from an image of an eye and determines the position thereof. The determined pupil position is stored in the storage unit 129. The shape of a pupil can be approximated as a circle. Thus, a position of a pupil can be expressed by the center coordinates and the radius of the pupil, for example. Note that a region of a pupil can be detected by extracting a pixel having brightness lower than a predetermined value, for example.

The iris image extraction unit 122 then detects an iris from the image of the eye and determines the position of the iris. The determined position of the iris is stored in the storage unit 129. A shape of an iris can be approximated as a ring shape including a pupil, and thus a position of an iris can be expressed by the center coordinates, the outer circumference radius, and the inner circumference radius of the iris, for example. The inner circumference radius of an iris corresponds to the radius of a pupil and thus may be omitted from information indicating the position of the iris. Note that an iris can be detected by extracting brightness change on the boundary between the outer circumference of the iris and a sclera (a so-called white of eye), for example.

The iris image extraction unit 122 then extracts an iris image by cutting out a portion of the determined iris. The extracted iris image is stored in the storage unit 129.

Figure 3A:
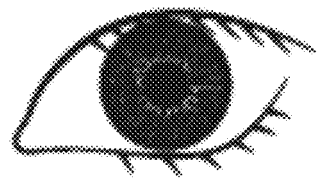
FIGS. 3A-3I are a schematic diagram illustrating the outline of a process performed by the information processing system according to the first example embodiment.
Figure 3B:
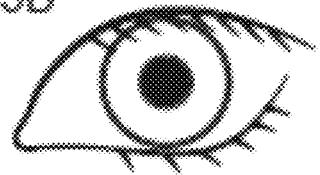
Figure 3C:
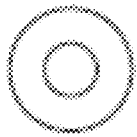
Figure 3D:
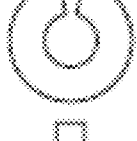
Figure 3E:
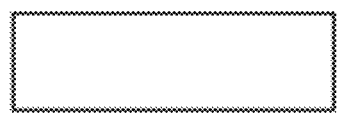

In step S103, the coordinate conversion unit 123 transforms the iris image by performing coordinate conversion. This process corresponds to FIG. 3(d) and FIG. 3(e). As illustrated in FIG. 3(d) and FIG. 3(e), the coordinate conversion unit 123 converts a ring-shaped iris image into a rectangle. This process may be performed by converting the coordinate system of an iris image from an x-y plane coordinate system into an r-θ polar coordinate system, for example. Since such coordinate conversion simplifies the shape of an iris image, the process of feature amount calculation is simplified.

In step S104, the block division unit 124 divides the iris image converted to a rectangle into a plurality of blocks. This process corresponds to FIG. 3(f). The number of divisions may be, for example, 128 in the horizontal direction and 16 in the vertical direction (that is, 2048 in total) or the like. Note that, while FIG. 3(f) expresses the iris image itself as being cut and divided into a plurality of pieces for easier understanding, it is not essential to divide an image into a plurality of pieces. The process of step S104 may be a process to acquire a correspondence between the brightness of each block of an iris image and the coordinates of each block, for example.

In step S105, the feature amount calculation unit 125 performs a process to calculate feature amounts on the iris image divided into a plurality of blocks. This process corresponds to FIG. 3(g). One example of a specific processing method of feature amount calculation will be described below.

The feature amount calculation unit 125 acquires the brightness in each block of the iris image. At this time, a feature amount code of a certain block (hereafter, referred to as a first block) is set in accordance with a level relationship of brightness relative to a block which is right next to the first block (hereafter, referred to as a second block). When the difference resulted by subtracting the brightness of the second block from the brightness of the first block is larger than a first threshold, the feature amount code of the first block is "1". When the difference resulted by subtracting the brightness of the second block from the brightness of the first block is less than or equal to the first threshold and greater than a second threshold, the feature amount code of the first block is "2". When the difference resulted by subtracting the brightness of the second block from the brightness of the first block is less than or equal to the second threshold, the feature amount code of the first block is "3". In such a way, the feature amount code has at least three types of values. Note that, while three types of feature amount codes are set by using two types of thresholds in the example described above, the number of the types of thresholds is an example and may be suitably set. For example, when one type of threshold is used (only the first threshold), the feature amount code may be two types of "1" or "2". Further, when three or more types of thresholds are used, the feature amount code will be four or more types such as "1", "2", "3", "4", . . . . As discussed above, the number of types of the feature amount code may be any number of two or more in accordance with the number of types of thresholds.

Further, when the first block or the second block is covered with eyelashes, an eyelid, or the like and unable to be used for feature amount calculation, a code other than a feature amount code set in accordance with the level relationship of brightness may be set. As one example, when a feature amount code set in accordance with the level relationship of brightness has three types of "1", "2", and "3", a feature amount code indicating that no feature amount can be calculated may be "4". In such a case, the feature amount code has four types of values. In the following description, the feature amount code has the four types described above.

Figure 3I:
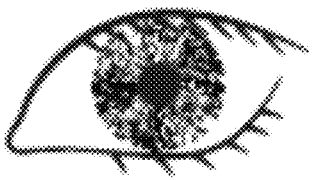
Figure 3H:
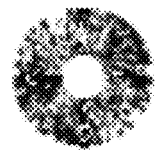
Figure 3G:
Figure 3F:
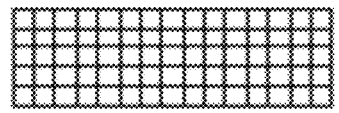

FIG. 3(g) illustrates a feature amount image in which feature amount codes are depicted at respective block positions. In the feature amount image of FIG. 3(g), values "1", "2", "3", and "4" of the feature amount code are displayed by different patterns. This display may be display in which the image pattern such as the color, the brightness, the pattern, or the like may be changed in accordance with the value of the code, for example. The extracted feature amount or the extracted feature amount image is stored in the storage unit 129.

Note that, while a positional relationship in which the second block is right next to the first block is illustrated in the example described above, the second block may be left next to the first block, or more generally, it may be a positional relationship in which the second block is adjacent to the first block.

In step S106, the comparison unit 126 performs a process to compare a feature amount calculated in step S105 with a feature amount registered in advance. In this process, the feature amount calculated in step S105 is compared with a feature amount registered in advance to determine a region where there is a matching (a matching region), a region where there is no matching (a non-matching region), and a region where no comparison can be made (a non-comparable region). For example, a region in which all the codes to be compared are "1" or "3" may be determined as a matching region. A region in which one of the codes to be compared is "1" and the other is "3" may be determined as a non-matching region. A region in which any of the codes to be compared is "4" cannot be used for comparison and thus may be determined as a non-comparable region. When a score of a matching degree calculated from the size or the like of matching regions and non-matching regions exceeds a predetermined threshold, two iris images corresponding to two feature amounts to be compared are determined to be from the same person. A comparison result and information on a matching region, a non-matching region, and a non-comparable region are stored in the storage unit 129. Note that information on a feature amount, a matching region, a non-matching region, and a non-comparable region may be more generally referred to as comparison information regarding iris comparison.

In step S107, the coordinate conversion unit 123 transforms the feature amount image by converting coordinates. This process corresponds to FIG. 3(h). The coordinate conversion unit 123 converts a rectangular feature amount image into a ring shape. This process may be performed by converting the coordinate system of a feature amount image from an r-θ polar coordinate system into an x-y plane coordinate system, for example. Such coordinate conversion provides a feature amount image in which images each indicating a value of a code of each block are arranged in a ring shape so as to correspond to the position in the iris from which each code has been generated. The converted feature amount image is stored in the storage unit 129.

In step S108, the display image generation unit 127 generates a display image including one in which the feature amount image converted in the ring shape is superimposed on the image of the eye of the comparison subject acquired by step S101. This process corresponds to FIG. 3(i). The generated display image is stored in the storage unit 129. Note that an image of an eye may be a photograph of an eye of a recognition subject acquired for iris authentication as illustrated in FIG. 3(i) but not limited thereto and may be an image of other's eye or a drawing of an eye, for example.

In step S109, the display unit 128 reads a display image from the storage unit 129 and displays the display image. In the following, a display image displayed on the display unit 128 will be described in more detail.

Figure 5:
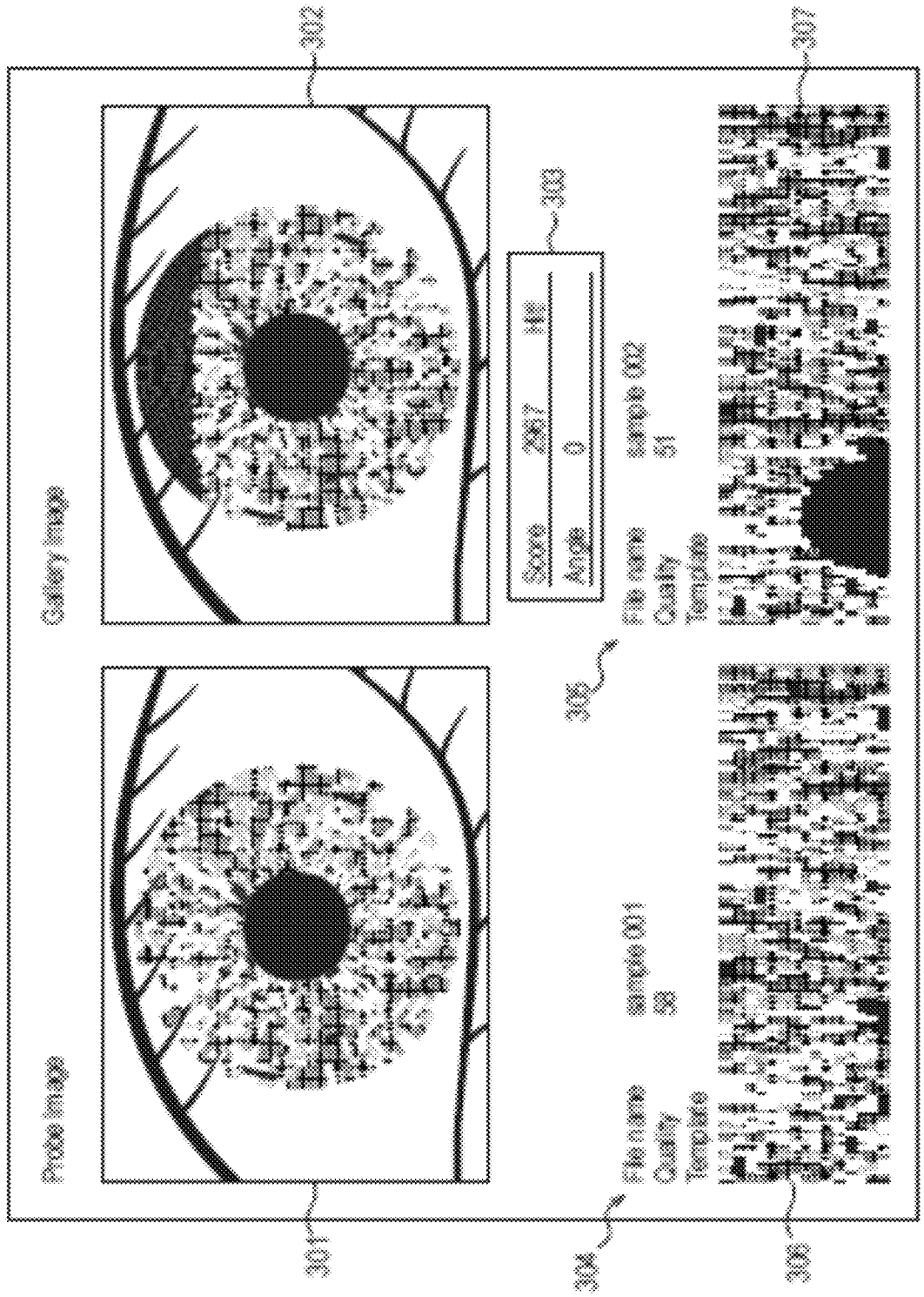
FIG. 5 illustrates an example of a display image due to the information processing system according to the first example embodiment.

FIG. 5 is an example of a display image displayed on the display unit 128. In the display image, a display region 301 provided with a caption of "Probe Image" and a display region 302 provided with a caption of "Gallery Image" are displayed so as to be arranged side by side. The display region 301 is a region that displays an image of an eye acquired at comparison and the feature amount thereof. The image generated in step S108 is displayed in the display region 301. The display region 302 is a region that displays an image of a pre-registered eye and the feature amount thereof.

A display region 303 is displayed below the display region 302. A matching degree "Score" in comparison, an angle correction value of an iris image "Angle", and a comparison result are displayed in the display region 303. As illustrated in FIG. 5, the value of the matching degree is 2967 in this example. This value is greater than a predetermined determination threshold and thus indicates that two images of eyes are from the same person. Thus, a matching "Hit!" is displayed as a comparison result in the display region 303. Note that, when a comparison result is non-matching, "NoHit" instead of "Hit!" is displayed in the display region 303. By confirming the matching degree, the user of the information processing system 10 can check a reliability of the iris comparison. The information processing system 10 has a function that, when the face is inclined at the time of acquisition of an iris image, rotates an iris image in order to correct the inclination. An angle correction value of an iris image indicates an angle correction value when this rotation is performed. As illustrated in FIG. 5, the angle correction value of the iris image is 0 degree in this example.

A display region 304 is displayed below the display region 301. A file name "File name" and an extraction quality of a feature amount (Quality) are displayed in the display region 304. The file name may be, for example, a file name of an iris image, a file name of a feature amount converted from an iris image, or a file name of a set of an iris image and a feature amount. The extraction quality of a feature amount is an evaluation value indicating the quality of a feature amount calculated based on a criterion, such as an area of a region other than a non-comparable region, which is determined in terms of accuracy of iris comparison, for example. By checking this evaluation value, the user of the information processing system 10 can check whether or not conversion of a feature amount is appropriately performed. Further, a display region 305 is displayed below the display region 303. The display region 304 and the display region 305 are displayed so as to be arranged side by side. Since the content of the display region 305 is the same as that of the display region 304, the description thereof will be omitted.

A display region 306 is displayed below the display region 304. A feature amount of an image of an eye acquired at comparison is displayed in the display region 306. Unlike the feature amount displayed in the display region 301, the feature amount displayed in the display region 306 is a feature amount of a rectangle on which coordinate conversion has not yet been performed. Further, a display region 307 is displayed below the display region 305. A feature amount of an image of an eye registered in advance is displayed in the display region 307. The display region 306 and the display region 307 are displayed so as to be arranged side by side. Further, as illustrated in FIG. 5, a caption of "Template" is provided to each of the display regions 306 and 307.

Pieces of information corresponding to an image of an eye acquired at comparison "Prove Image" are arranged vertically and displayed in the left in the display image, and pieces of information corresponding to an image of an eye registered in advance "Gallery Image" are arranged vertically and displayed in the right in the display image. Thus, the user of the information processing system 10 can understand information regarding iris comparison at a glance.

Figure 6:
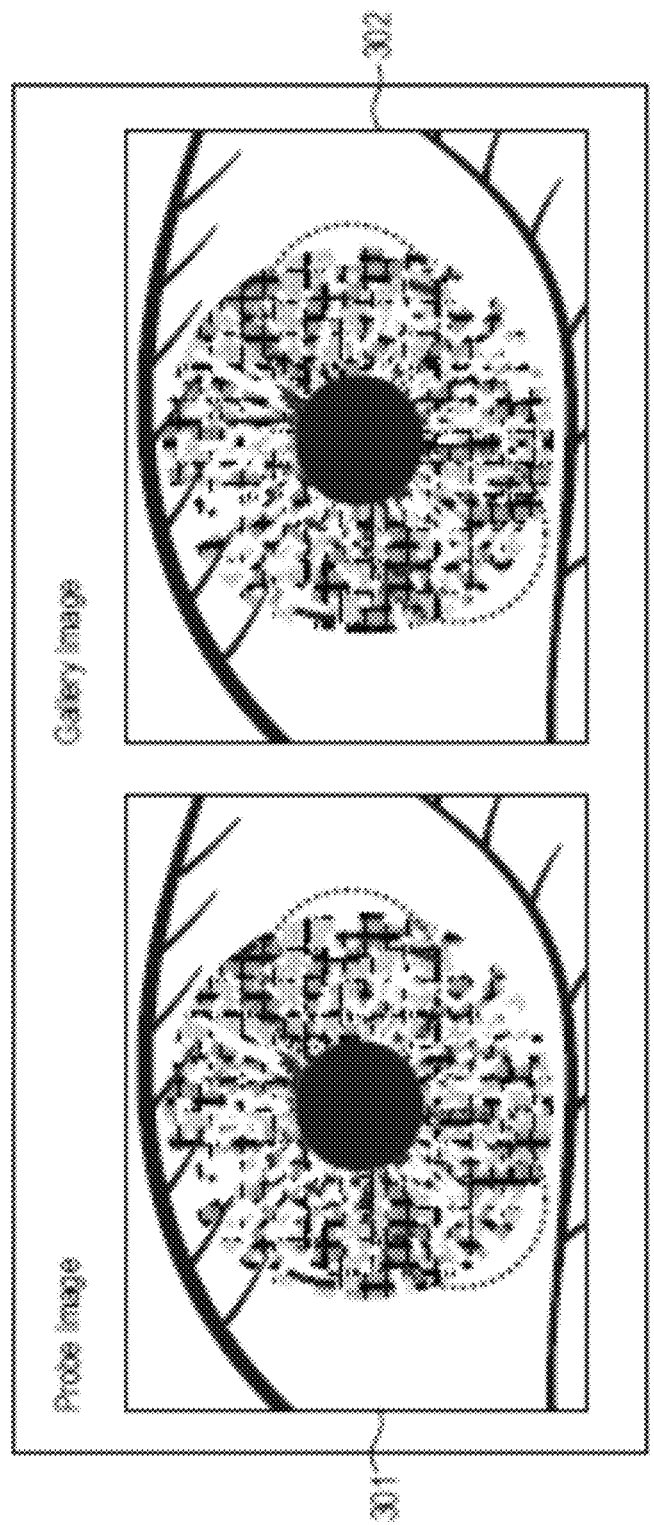
FIG. 6 illustrates an example of a display image due to the information processing system according to the first example embodiment.

FIG. 6 is a display example of the display regions 301 and 302 when iris images from the same person are compared. The feature amounts indicated in the display regions 301 and 302 are captured at different timings and thus are not fully matched. For example, the range of a non-comparable region is different from each other due to eyelashes. When the inside parts of circles surrounded by dotted lines in FIG. 6 are focused on, however, it can be seen that the patterns of the feature amounts indicated in the display regions 301 and 302 are substantially matched.

Figure 7:
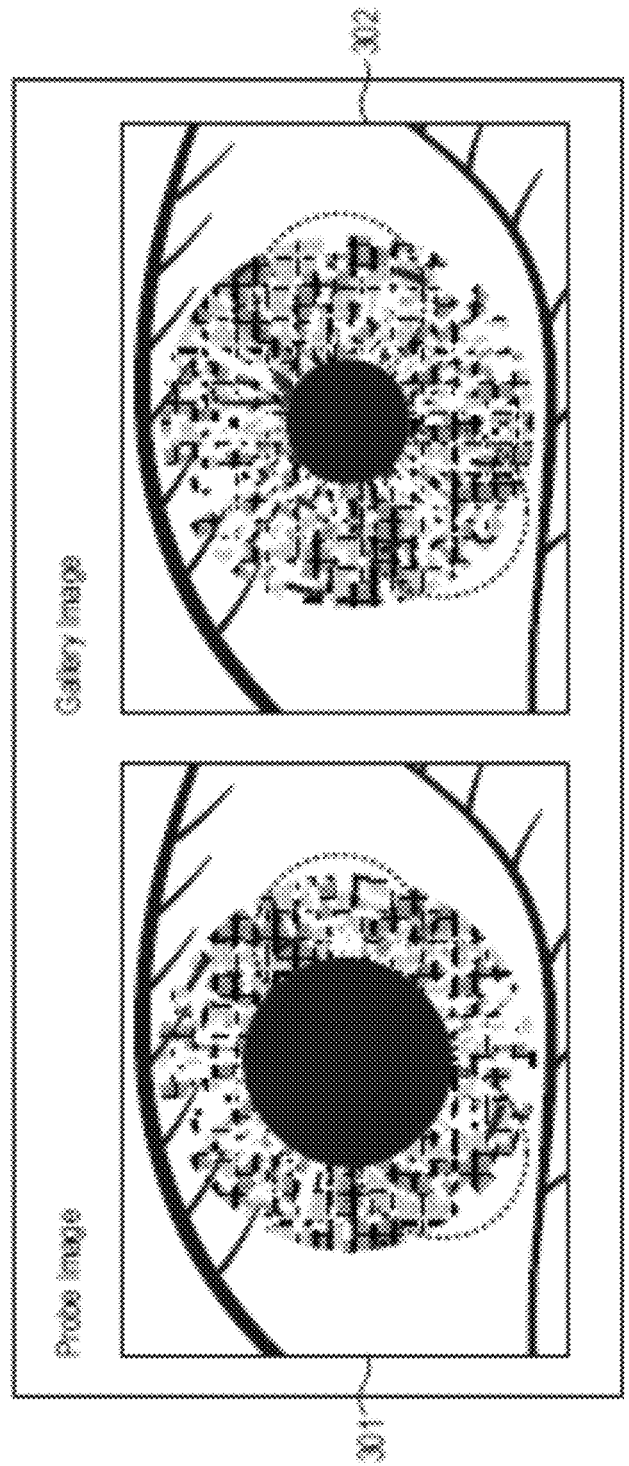
FIG. 7 illustrates an example of a display image due to the information processing system according to the first example embodiment.

FIG. 7 is a display example of the display regions 301 and 302 when iris images from different persons are compared. When the inside parts of circles surrounded by dotted lines in FIG. 7 are focused on, it can be seen that the patterns of the feature amounts indicated in the display regions 301 and 302 are different from each other.

In such a way, the information processing system 10 can display a feature amount image in association with positions in an iris of a recognition subject. Thus, the user of the information processing system 10 may know not only information on a comparison result but also specific information as to which position and what degree the feature amount is matched. Thereby, the user may further know information regarding a matching region, a non-matching region, or a non-comparable region of the feature amount for each position in an iris.

The advantages in the user of the information processing system 10 obtaining the above information will be described. As described above, when feature amounts are extracted from an iris image, the shape is often transformed for the purpose of increasing efficiency of processing or the like. In such a case, even if the obtained feature amounts are displayed, the correspondence between the feature amounts and positions in the iris may be unknown, and thus such display may be not so useful for the user. In contrast, since the information processing system 10 of the present example embodiment transforms a feature amount image into a ring shape and then displays the transformed image in association with positions in an iris of a recognition subject, the user may clearly understand the correspondence between the feature amounts and the positions in the iris.

A case where it is desirable for the user to understand the correspondence between feature amounts and positions in an iris will be described with some examples. When eyelashes, a hair, an eyelid, or the like of a recognition subject overlaps an iris, no accurate comparison result may be obtained. At this time, it is not always easy to identify the cause of being unable to obtain an accurate comparison result from only the comparison result. When eyelashes, a hair, an eyelid, or the like overlaps an iris, typically, non-matching regions or non-comparable regions concentrate in the upper side in an iris. In such a way, when no accurate comparison result is obtained, a feature may often appear at a position in the non-matching region or the non-comparable region. Accordingly, by identifying from the information processing system 10 which location a non-matching region or a non-comparable region is located in, the user can determine whether or not a comparison result is correct.

Another example will be described. Identity verification automatically performed by an iris recognition apparatus is not always reliable. Accordingly, in a situation where it is necessary to carefully perform identity verification, a human may finally review the comparison detail such as a matching part or the like in addition to an automatic comparison performed by the information processing system 10. Thus, a function of visually reviewing a feature amount may be desired. In such a case, even if feature amounts in rectangles used for comparison are displayed, it is not easy for a human viewing this display to identify which location of an iris the patterns are matched and perform the final confirmation of the comparison detail. However, since the information processing system 10 of the present example embodiment transforms a feature amount image into a ring shape fitted to the shape of an iris, it is possible to easily identify which location in the iris the pattern is matched.

As described above, according to the present example embodiment, it is possible to provide an information processing system, an information processing method, and an information processing program that can display information regarding iris comparison in more detail.

Note that the method of generating a display image of the present example embodiment may be used regardless of a method of extracting a feature amount. When a scheme involving convolution such as a Gabor Filter is used, however, the correspondence between resulted coordinates of a code of a feature amount and coordinates of a pixel of an image may be partially lost. In contrast, since the scheme of step S105 described above does not perform convolution, the correspondence of feature amounts and positions in an iris can be less likely to be lost.

Each of images of eyes displayed in the display regions 301 and 302 may be one obtained by scaling up or scaling down an image actually captured. Thereby, an image of an eye acquired at comparison and an image of an eye acquired at registration can be displayed as of the same size even when the original sizes thereof are different from each other. At this time, by setting the magnification of scale up or scale down so as to have substantially the same size of irises, the visual sizes of the images of the eyes can be closer.

As described in the illustration of FIG. 3(*i*) and step S108, although it is possible to allow the user to easily know the positional correspondence between feature amounts and an iris by superimposing feature amounts on an image of an eye, this is not essential. The form of the present example embodiment is not limited to the above as long as such display in which the content of comparison information is transformed into a form by which the correspondence with respect to positions in the iris is known is performed. For example, the configuration of the present example embodiment may be modified so that a feature amount image transformed into a ring shape as illustrated in FIG. 3(*h*) is displayed on the display unit 128 without being superimposed on an image of an eye. In such a case, a process can be simplified.

Second Example Embodiment

Another display example of a display image will be described as a second example embodiment with reference to FIG. 8 to FIG. 11. Since elements other than a screen displayed on the display unit 128 are the same as those in the first example embodiment, the description thereof will be omitted. Further, also for the configuration of a display screen, description of features duplicated with the first example embodiment will be omitted.

Figure 8:
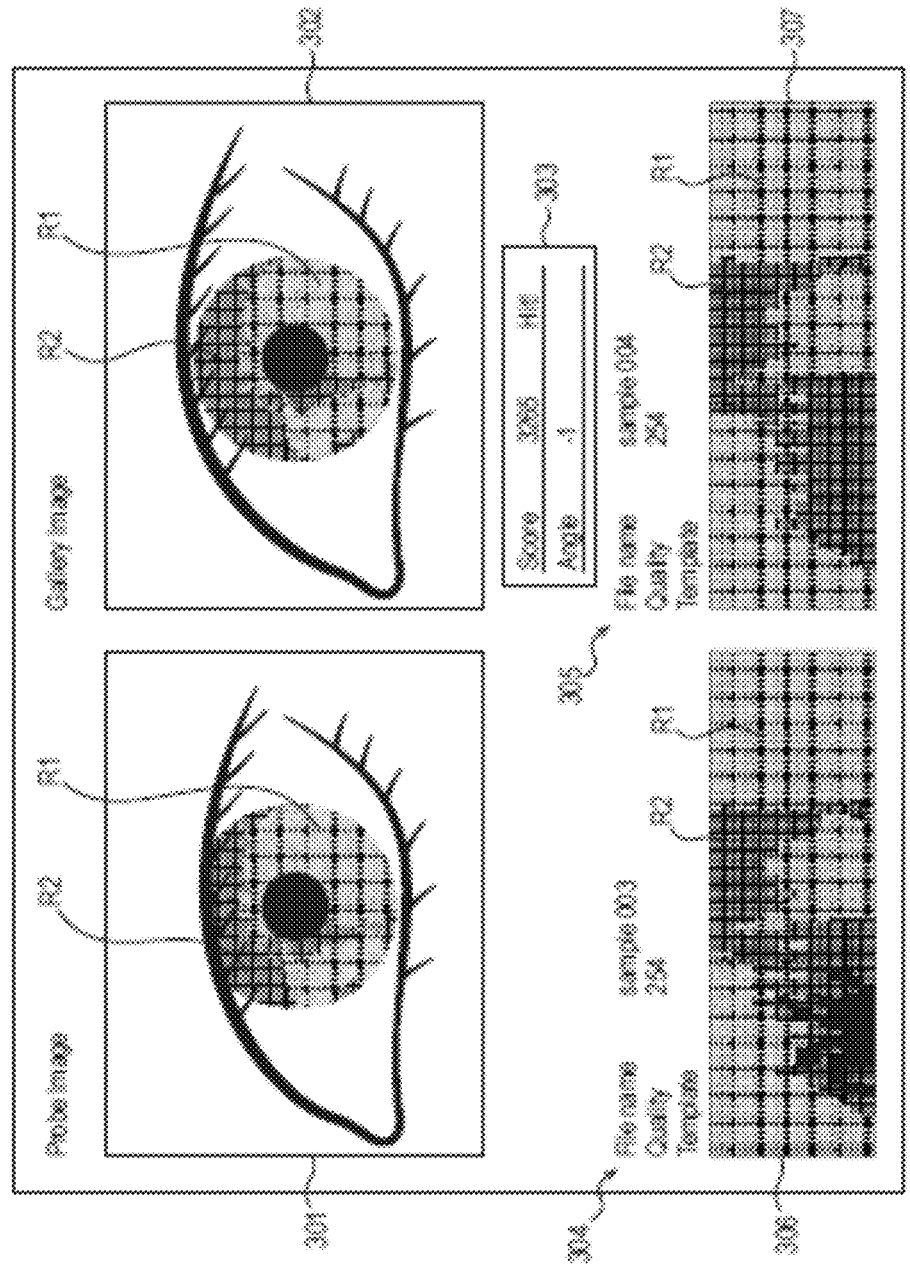
FIG. 8 illustrates an example of a display image due to an information processing system according to a second example embodiment.

FIG. 8 is a display example of a display image when iris images of the same person are compared. The difference between the present example embodiment and the first example embodiment is in that, instead of the feature amounts, matching regions R1 and non-matching regions R2 of the feature amount are displayed on the display regions 301, 302, 306, and 307. The display of the matching region R1 and the non-matching region R2 may be displayed by being colored in different colors, for example. Even by referencing to the display regions 306 and 307 of FIG. 8, it is not easy to identify which portion of the iris is matched. However, by referencing the distribution of the matching regions R1 of the display regions 301 and 302, it is easy to identify that the lower parts of the iris are substantially matched. Although there are many non-matching regions R2 in the upper parts of the iris, it is understood from the photographs of the eyes in the display regions 301 and 302 that this is because an upper eyelid and eyelashes overlap the iris.

Note that, as illustrated in the display region 303, the value of the matching degree "Score" is 3265 and larger than the value in the case of non-matching described above. Further, a matching "Hit!" is displayed as a comparison result. These enable the user to identify that the comparison result obtained by the information processing system 10 corresponds to the same person.

Figure 9:
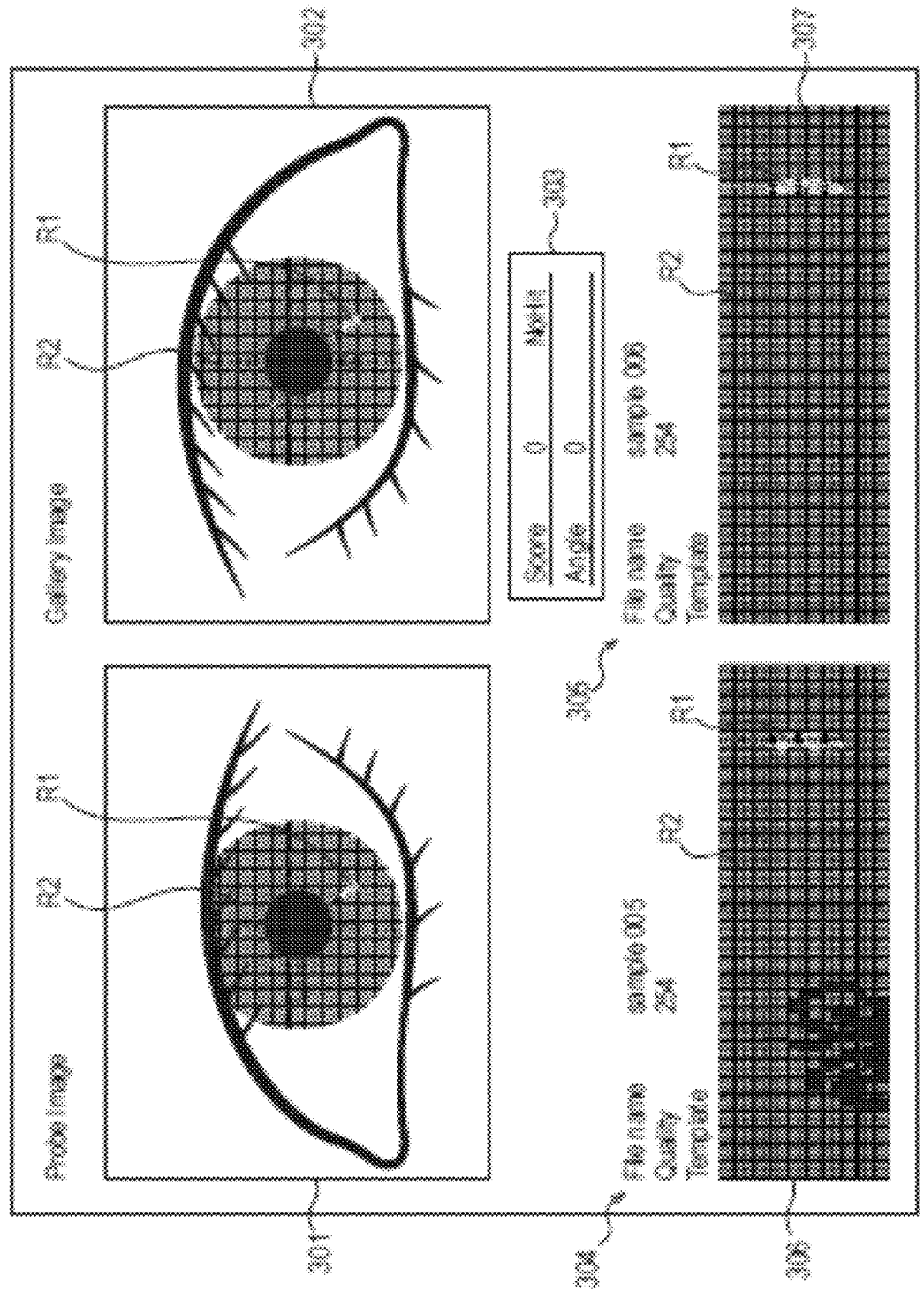
FIG. 9 illustrates an example of a display image due to the information processing system according to the second example embodiment.

FIG. 9 is a display example of a display image when iris images of different persons are compared. Substantially the entire region of the iris is classified as the non-matching region R2, and there is substantially no matching region R1. Thus, the user can identify that the two iris images are actually from different persons.

Note that, as illustrated in the display region 303, the value of the matching degree "Score" is 0, which is the value indicating a non-matching. Further, a non-matching "NoHit" is displayed as a comparison result. These enable the user to identify that the comparison result obtained by the information processing system 10 is a non-matching.

As described above, also in the present example embodiment, it is possible to provide an information processing system, an information processing method, and an information processing program that can display information regarding iris comparison in more detail. Further, by displaying the matching region R1 and the non-matching region R2 not in a form of feature amounts but in a direct manner, the user may identify comparison information more intuitively than the case of the first example embodiment.

In the present example embodiment, a non-comparable region may be further distinguished from the matching region R1 and the non-matching region R2 and displayed. In such a case, the matching region R1, the non-matching region R2, and the non-comparable region may be displayed by being colored in different colors. This enables the user to further obtain information on the non-comparable region. Alternatively, any two of the matching region R1, the non-matching region R2, and the non-comparable region may have the same color. Also in this case, one region and the remaining regions can be distinguished and displayed.

Figure 10:
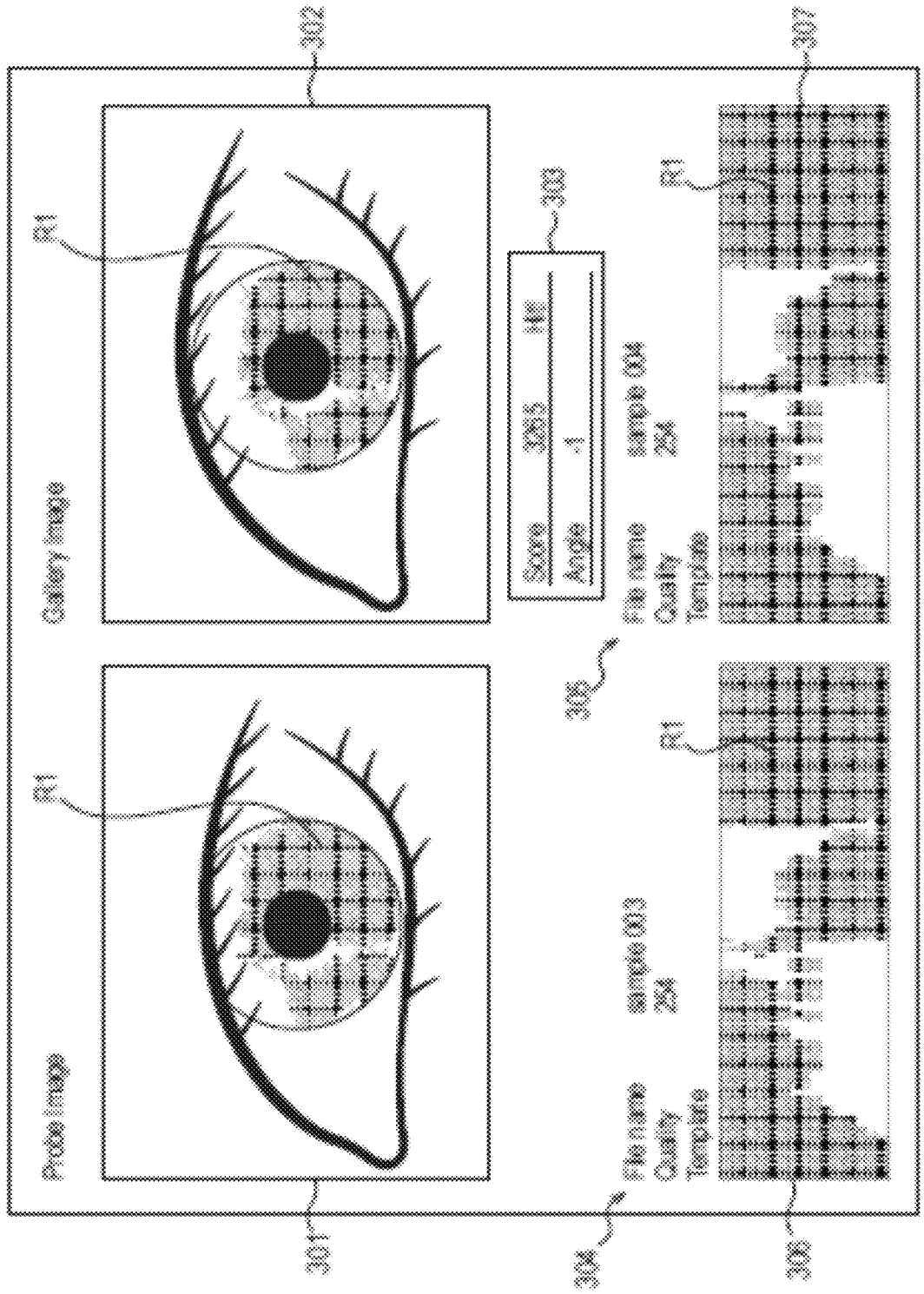
FIG. 10 illustrates an example of a display image due to the information processing system according to the second example embodiment.
Figure 11:
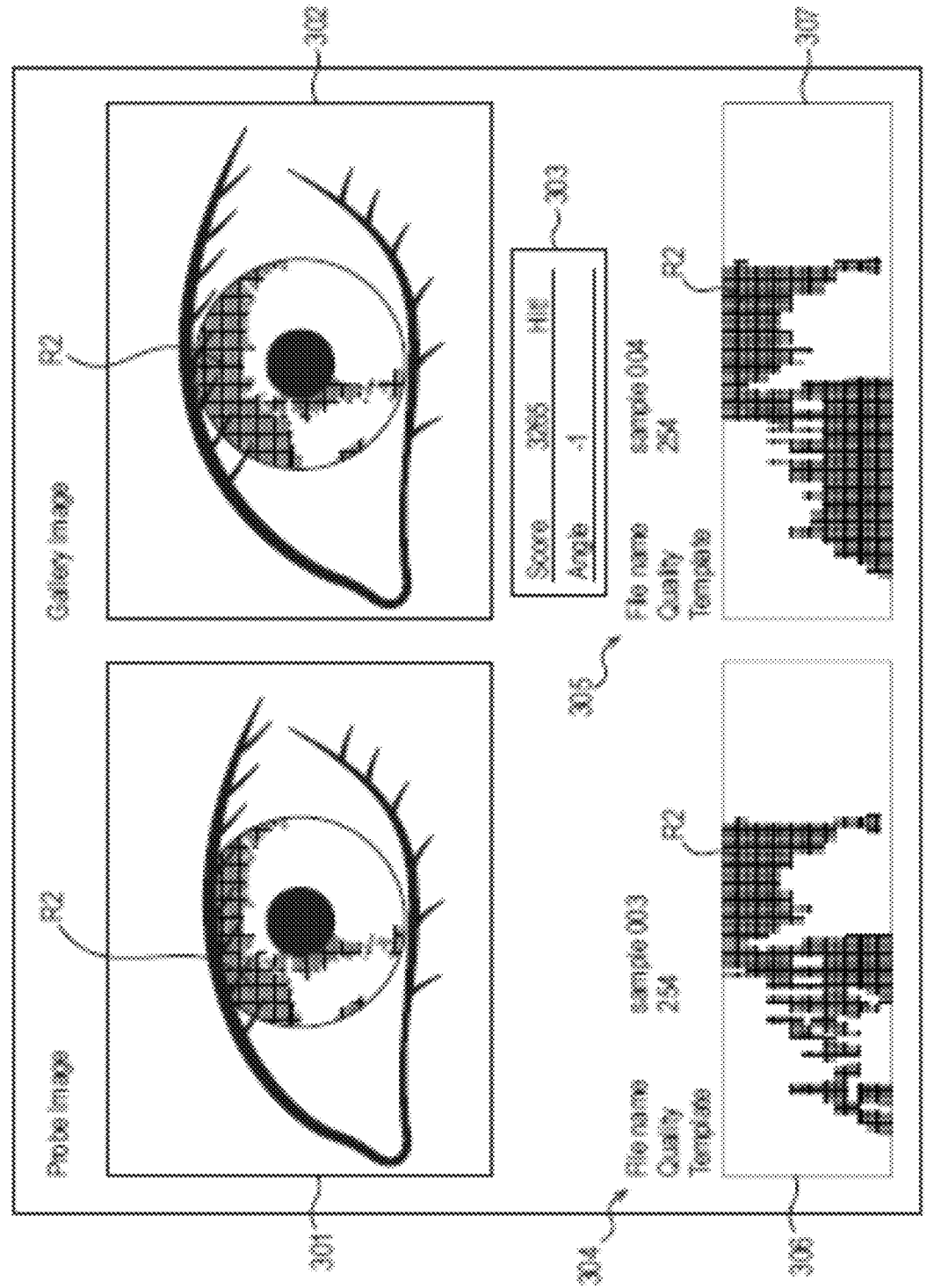
FIG. 11 illustrates an example of a display image due to the information processing system according to the second example embodiment.

Further, as illustrated in FIG. 10, the configuration of the present example embodiment may be modified so that the display of the non-matching region R2 and the non-comparable region is omitted and only the matching region R1 is colored and displayed. Furthermore, as illustrated in FIG. 11, the configuration of the present example embodiment may be modified so that the display of the matching region R1 and the non-comparable region is omitted and only the non-matching region R2 is colored and displayed. In such a way, the display scheme of the present example embodiment may be one indicating an image of an eye colored in a predetermined color for at least one of the matching region, the non-matching region, and the non-comparable region.

Further, the matching region R1 and the non-matching region R2 may be superimposed on the display of feature amounts described in the first example embodiment and displayed. In such a case, the matching region R1 and the non-matching region R2 may be displayed as a semitransparent colored region. This enables the user to obtain both information on feature amounts and information on the matching region R1 and the non-matching region R2.

As illustrated in FIG. 8 to FIG. 11, although it is possible to allow the user to easily known the positional correspondence between feature amounts and an iris by superimposing the matching region R1, the non-matching region R2, or the non-comparable region on an image of an eye, this is not essential. The form of the present example embodiment is not limited to the above as long as such display in which the content of comparison information is transformed into a form by which the correspondence with respect to positions in the iris is known is performed. For example, the configuration of the present example embodiment may be modified so that the matching region R1, the non-matching region R2, or the non-comparable region is displayed on the display unit 128 without images arranged in a ring shape being superimposed on an image of an eye. At this time, the region displayed on the display unit 128 may be at least one of the matching region R1, the non-matching region R2, and the non-comparable region. In such a case, a process can be simplified.

Note that the determination of the matching region R1, the non-matching region R2, and the non-comparable region may be performed in the same manner as the process of the comparison unit 126 described in the illustration of step S106 in the first example embodiment. That is, a region in which blocks having "1" for all the codes to be compared and blocks having "3" for all the codes to be compared are combined may be set as the matching region R1. A region in which blocks having "1" for one of the codes to be compared and "3" for the other are combined may be set as the non-matching region R2. A region in which blocks having "4" for any of the codes to be compared are combined may be determined as non-comparable region.

Third Example Embodiment

Figure 12:
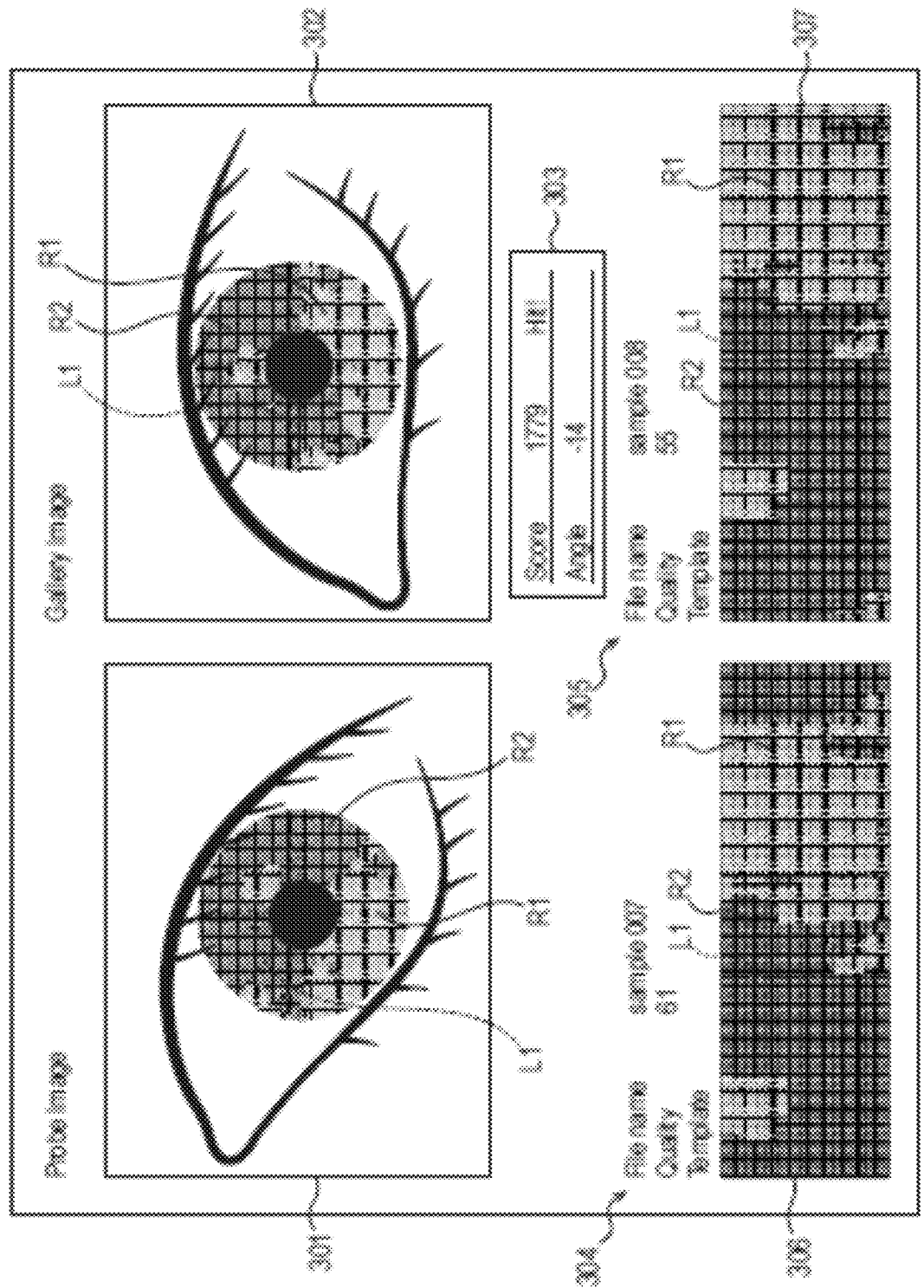
FIG. 12 illustrates an example of a display image due to an information processing system according to a third example embodiment.

Another display example of a display image will be described as a third example embodiment with reference to FIG. 12. Since elements other than a screen displayed on the display unit 128 are the same as those in the first example embodiment or the second example embodiment, the description thereof will be omitted. Further, also for the configuration of a display screen, description of features duplicated with the first example embodiment or the second example embodiment will be omitted. FIG. 12 is a display example of a display image when iris images of the same person are compared.

FIG. 12 is a display example of a display image when iris images of the same person are compared. The difference between the present example embodiment and the second example embodiment is in that angle indication lines L1 each indicating an angle of an eye are displayed. Capturing of an image of an eye for iris comparison is not always performed an ideal capturing environment. Thus, an inclined image as illustrated in the display region 301 may be captured. The information processing system 10 has an angle correction function to address such a case and performs comparison taking the inclination into consideration. The display region 303 indicates that the angle correction value "Angle" of an iris image is −14 degrees. On the other hand, the user reviewing the display image may not identify that one of the images of the eye is inclined, and the iris images may appear to be those from different persons. Thus, in the present example embodiment, by displaying the angle indication lines L1 each indicating the angle of the eye, it is possible to allow the user to identify that an iris image is inclined. Further, at this time, at least one of the images displayed in the display region 301 "Probe image" and the display region 302 "Gallery image" may be rotated so as to reduce the difference in angle. Specifically, at least one of the images of eyes displayed in the display regions 301 and 302 may be rotated and displayed so that the positions of the angle indication lines L1 are matched. By displaying images having closer angles, even when one of the captured iris images is inclined, the user may more intuitively identify whether or not the iris images are from the same person.

As described above, also in the present example embodiment, it is possible to provide an information processing system, an information processing method, and an information processing program that can display information regarding iris comparison in more detail. Further, by displaying the angle indication lines L1, the user may correctly identify the inclination of an iris image.

The information processing system described in the above example embodiments can be configured as with a fourth example embodiment below.

Fourth Example Embodiment

Figure 13:
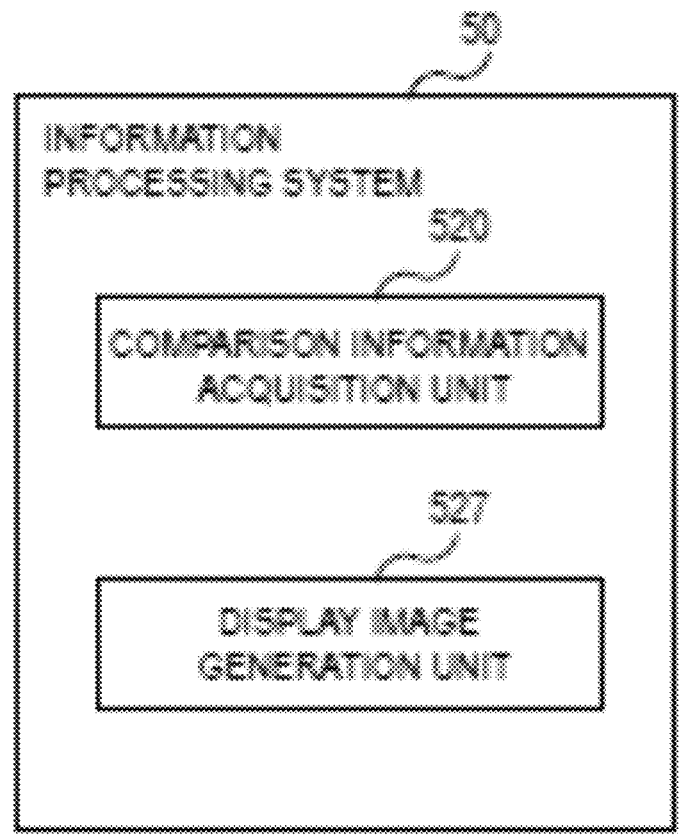
FIG. 13 is a function block diagram of an information processing system according to a fourth example embodiment.

FIG. 13 is a function block diagram of an information processing system 50 according to the fourth example embodiment. The information processing system 50 has a comparison information acquisition unit 520 and a display image generation unit 527. The comparison information acquisition unit 520 acquires comparison information regarding iris comparison generated based on an iris image including an iris of a recognition subject. The display image generation unit 527 generates a display image used for displaying comparison information image indicating a content of the comparison information on a display device in association with positions in the iris.

According to the present example embodiment, it is possible to provide an information processing system that can display information regarding iris comparison in more detail.

MODIFIED EXAMPLE EMBODIMENTS

The present invention is not limited to the example embodiment described above but can be changed as appropriate within a range not departing from the spirit of the present invention.

In each of the example embodiments described above, acquisition of an image used in iris comparison may be performed on one of the eyes or may be performed on both of the eyes of an authentication subject. Advantages of improvement of a processing speed and reduction in a storage capacity are obtained when an image of one of the eyes is captured, and an advantage of improvement of authentication accuracy is obtained when images of both of the eyes are acquired.

While the information processing systems used in iris comparison has been illustrated as examples in each of the above example embodiments, the present invention is also applicable to biometrics recognition other than iris comparison by appropriately changing the configuration of the example embodiment. For example, the present invention is also applicable to vein recognition in which the pattern of a vein of a palm, a finger, or the like is recognized to perform identity verification. In the case of vein recognition of a palm, the same display as that in the case of iris comparison can be performed by the content of comparison information being superimposed on an image of a palm and displayed. Further, the present invention is also applicable to voice recognition in which a voiceprint indicating a feature of frequency characteristics of a voice is recognized to perform identity verification. In this case, the same display as that in the case of iris comparison can be performed by the content of comparison information being superimposed on an image of a voiceprint and displayed.

The scope of each example embodiment also includes a processing method of storing, in a storage medium, a program that causes the configuration of the example embodiment to operate to implement the function of the example embodiment described above, reading out as a code the program stored in the storage medium, and executing the code in a computer. That is, a computer readable storage medium is also included in the scope of each example embodiment. Further, not only the storage medium in which the program described above is stored but also the program itself is included in each example embodiment. Further, one or more components included in the example embodiments described above may be a circuit such as an Application Specific Integrated Circuit (ASIC), a Field Programmable Gate Array (FPGA), or the like configured to implement the function of each component.

As the storage medium, for example, a floppy (registered trademark) disk, a hard disk, an optical disk, a magneto-optical disk, a Compact Disk (CD)-ROM, a magnetic tape, a nonvolatile memory card, or a ROM can be used. Further, the scope of each of the example embodiments includes an example that operates on Operating System (OS) to perform a process in cooperation with another software or a function of an add-in board without being limited to an example that performs a process by an individual program stored in the storage medium.

The service implemented by the function of each example embodiment described above can be provided to the user in a form of Software as a Service (SaaS).

Note that all the example embodiments described above are mere examples of embodiment in implementing the present invention, and the technical scope of the present invention should not be construed in a limiting sense by these example embodiments. That is, the present invention can be implemented in various forms without departing from the technical concept thereof or the primary feature thereof.

The whole or part of the example embodiments disclosed above can be described as, but not limited to, the following supplementary notes.

(Supplementary Note 1)

An information processing system comprising:

a comparison information acquisition unit that acquires comparison information regarding iris comparison generated based on an iris image including an iris of a recognition subject; and a display image generation unit that generates a display image including an image indicating a content of the comparison information in association with positions in the iris.

(Supplementary Note 2)

The information processing system according to supplementary note 1, wherein the display image includes an image in which the content of the comparison information is superimposed on an image of an eye.

(Supplementary Note 3)

The information processing system according to supplementary note 1 or 2, wherein the display image includes an image in which the content of the comparison information is superimposed on a photograph of an eye of the recognition subject used in the iris comparison.

(Supplementary Note 4)

The information processing system according to any one of supplementary notes 1 to 3, wherein the display image includes an image indicating the content of the comparison information in association with positions in the iris by arranging the content of the comparison information in a shape of the iris.

(Supplementary Note 5)

The information processing system according to any one of supplementary notes 1 to 4, wherein the display image includes an image indicating feature amounts extracted from the iris image.

(Supplementary Note 6)

The information processing system according to supplementary note 5, wherein the feature amounts include a plurality of blocks associated with the positions in the iris, and wherein a code extracted from the iris image is set for each of the plurality of blocks.

(Supplementary Note 7)

The information processing system according to supplementary note 6, wherein the code has one value selected from at least three types of values.

(Supplementary Note 8)

The information processing system according to supplementary note 6 or 7, wherein the code is extracted based on brightness of the iris image.

(Supplementary Note 9)

The information processing system according to any one of supplementary notes 6 to 8, wherein the plurality of blocks include a first block and a second block adjacent to the first block, and wherein the code in the first block has a value based on a difference between brightness of the iris image corresponding to the first block and brightness of the iris image corresponding to the second block.

(Supplementary Note 10)

The information processing system according to supplementary note 9, wherein the code in the first block has a value based on a predetermined threshold and a difference between brightness of the iris image corresponding to the first block and brightness of the iris image corresponding to the second block.

(Supplementary Note 11)

The information processing system according to any one of supplementary notes 6 to 10, wherein at least one of a matching region, a non-matching region, and a non-comparable region in the iris comparison is determined based on the code.

(Supplementary Note 12)

The information processing system according to any one of supplementary notes 6 to 11, wherein the display image includes an image in which images each indicating a value of the code are arranged in a ring shape so as to correspond to the positions in the iris.

(Supplementary Note 13)

The information processing system according to any one of supplementary notes 5 to 12, wherein the display image includes display of information indicating an extraction quality of the feature amounts.

(Supplementary Note 14)

The information processing system according to any one of supplementary notes 1 to 13, wherein the display image includes an image indicating at least one of a matching region, a non-matching region, and a non-comparable region in the iris comparison.

(Supplementary Note 15)

The information processing system according to supplementary note 14, wherein at least one of the matching region, the non-matching region, and the non-comparable region is indicated by coloring an image of an eye in a predetermined color.

(Supplementary Note 16)

The information processing system according to any one of supplementary notes 1 to 15, wherein the display image includes an image indicating contents of two pieces of the comparison information corresponding to two iris images compared in the iris comparison.

(Supplementary Note 17)

The information processing system according to supplementary note 16, wherein at least one of the contents of the two pieces of comparison information is rotated so as to reduce a difference in angle between the two iris image.

(Supplementary Note 18)

The information processing system according to any one of supplementary notes 1 to 17, wherein the display image includes display of information indicating a matching degree of the iris comparison.

(Supplementary Note 19)

The information processing system according to any one of supplementary notes 1 to 18, wherein the display image includes display of information indicating an angle of the iris image.

(Supplementary Note 20)

The information processing system according to any one of supplementary notes 1 to 19, wherein the display image includes an image in which an image indicating an angle of the iris image is superimposed on an image of an eye.

(Supplementary Note 21)

The information processing system according to any one of supplementary notes 1 to 20 further comprising a comparison unit that performs the iris comparison and generates the comparison information.

(Supplementary Note 22)

The information processing system according to any one of supplementary notes 1 to 21 further comprising a display unit that displays the display image.

(Supplementary Note 23)

An information processing method comprising:

acquiring comparison information regarding iris comparison generated based on an iris image including an iris of a recognition subject; and generating a display image including an image indicating a content of the comparison information in association with positions in the iris.

(Supplementary Note 24)

A storage medium storing an information processing program that causes a computer to perform:

acquiring comparison information regarding iris comparison generated based on an iris image including an iris of a recognition subject; and generating a display image including an image indicating a content of the comparison information in association with positions in the iris.

REFERENCE SIGNS LIST 10, 50 information processing system
101 CPU
102 RAM
103 ROM
104 HDD
105 communication I/F
106 display device
107 input device
108 light irradiation device
109 camera
110 bus
121 image acquisition unit
122 iris image extraction unit
123 coordinate conversion unit
124 block division unit
125 feature amount calculation unit
126 comparison unit
127, 527 display image generation unit
128 display unit
129 storage unit
301-307 display region
520 comparison information acquisition unit
L1 angle display line
R1 matching region
R2 non-matching region

The invention claimed is:

1. An information processing apparatus comprising:
a memory configured to store instructions; and
a processor configured to execute the instructions to:
acquire feature amount information of an iris included in an iris image;
generate a first image in which the feature amount information acquired from the iris image is arranged in a rectangular shape, and a second image in which the feature amount information acquired from the iris image is superimposed on the iris image; and
output the first image and the second image,
wherein the second image includes a ring image in which the feature amount information is arranged in a ring shape so as to correspond to positions in the iris with which the feature amount information is associated.

2. The information processing apparatus according to claim 1,
wherein the ring image is superimposed on an iris region of the iris image.

3. The information processing apparatus according to claim 1,
wherein the feature amount information includes a plurality of blocks associated with the positions in the iris, and
wherein a code extracted from the iris image is set for each of the plurality of blocks.

4. The information processing apparatus according to claim 3,
wherein the code has one value selected from at least three types of values.

5. The information processing apparatus according to claim 3,
wherein the code is extracted based on a brightness of the iris image.

6. The information processing apparatus according to claim 3,
wherein the plurality of blocks of the iris image include a first block and a second block adjacent to the first block, and
wherein the code in the first block has a value based on a difference between a brightness of the iris image corresponding to the first block and a brightness of the iris image corresponding to the second block.

7. The information processing apparatus according to claim 6,
wherein the code in the first block has a value based on a predetermined threshold and a difference between the brightness of the iris image corresponding to the first block and the brightness of the iris image corresponding to the second block.

8. An information processing method comprising:
acquiring, by a processor, feature amount information of an iris included in an iris image; and
generating, by the processor, a first image in which the feature amount information acquired from the iris image is arranged in a rectangular shape, and a second image in which the feature amount information acquired from the iris image is superimposed on the iris image; and
outputting, by the processor, the first image and the second image,
wherein the second image includes a ring image in which the feature amount information is arranged in a ring shape so as to correspond to positions in the iris with which the feature amount information is associated.

9. A non-transitory computer-readable medium having stored therein a program executable by a processor for performing a method comprising:
acquiring feature amount information of an iris included in an iris image; and
generating a first image in which the feature amount information acquired from the iris image is arranged in a rectangular shape, and a second image in which a feature amount information acquired from the iris image is superimposed on the iris image; and
outputting the first image and the second image,
wherein the second image includes a ring image in which the feature amount information is arranged in a ring shape so as to correspond to associated positions in the iris with which the feature amount information is associated.

* * * * *